United States Patent
Costa

(10) Patent No.: US 7,535,687 B2
(45) Date of Patent: May 19, 2009

(54) ALARM SYSTEM SENSOR TOPOLOGY APPARATUS AND METHOD

(75) Inventor: Hilario S. Costa, Myakka, FL (US)

(73) Assignee: GE Security, Inc., Bradenton, FL (US)

( * ) Notice: Subject to any disclaimer, the term of this patent is extended or adjusted under 35 U.S.C. 154(b) by 370 days.

(21) Appl. No.: 11/402,951

(22) Filed: Apr. 13, 2006

(65) Prior Publication Data

US 2007/0241875 A1 Oct. 18, 2007

(51) Int. Cl.
*H02H 3/00* (2006.01)
(52) U.S. Cl. .......................... 361/42; 361/82
(58) Field of Classification Search ............... 361/42, 361/82
See application file for complete search history.

(56) References Cited

U.S. PATENT DOCUMENTS

| | | | |
|---|---|---|---|
| 4,172,252 A | 10/1979 | Wiberg | |
| 4,380,760 A * | 4/1983 | Kornblit | 340/628 |
| 4,506,254 A | 3/1985 | Right et al. | |
| 4,568,919 A | 2/1986 | Muggli et al. | |
| 2003/0048652 A1 | 3/2003 | Lontka et al. | |

FOREIGN PATENT DOCUMENTS

| | | |
|---|---|---|
| EP | 0468097 A2 | 1/1992 |
| EP | 0468234 A2 | 1/1992 |
| EP | 1363261 A1 | 11/2003 |

\* cited by examiner

*Primary Examiner*—Stephen W Jackson
(74) *Attorney, Agent, or Firm*—GE Global Patent Operation

(57) ABSTRACT

An alarm system sensor topology to reduce susceptibility to configuration errors and component failures includes a sensor configured to differentiate between system status conditions, including electrical power isolation for power polarity independence and for sustained sensor operation during power interruptions. A topological method for reducing fire sensor susceptibility to configuration errors and component failures includes configuring a sensor with capability to operate using electrical input power independent of power polarity, and providing capability to operate at least a part of the sensor circuitry for at least a specified time interval in the absence of applied electrical power.

22 Claims, 4 Drawing Sheets

ALARM SYSTEM SENSOR TOPOLOGY APPARATUS AND METHOD

FIELD OF THE INVENTION

The present invention relates generally to fire protection and other alarm systems. More particularly, the present invention relates to provisions in the sensor component of fire protection and security apparatus that extend communication capacity while simplifying installation and troubleshooting.

BACKGROUND OF THE INVENTION

A typical remotely installed and centrally monitored security device such as a fire protection sensor is commonly connected to a more centralized processing node, such as an alarm system control panel. Detection of an event (such as presence of particulates or ionized gases in air, excessive heat, interruption of a security link, and the like) by the security device is analyzed by the alarm system control panel or other security node. A decision to send out emergency notification such as alarm tones, flashing lights, or telephone calls to emergency responders is then made by an apparatus at the alarm system control panel or, if a hierarchy of control panels is used, at a more central location, based on detecting an unambiguous signal from at least one of a possible plurality of such sensors, and decided in accordance with a procedure encoded in the system.

In systems wherein the number of sensors is large, it is known in the art to connect several sensors in at least one "daisy chain" string according to any of a variety of configurations. In some systems, if at least one of the sensors in the at least one string is subsequently activated, i.e., detects an event, the alarm response can be made, irrespective of a capability by the central apparatus of identifying the exact location in the string of the activated device. In other systems, known methods can permit at least relative location of an activated sensor to be identified, such as by assigning unique identifiers to all sensors and configuring the sensors to transmit these identifiers as part of subsequent alarm messages. Since an alarm response of clearing a building, for example, is likely to be the same for whichever of a plurality of fire sensors in a system limited to that building is activated, the total amount of wiring may be reduced by configurations such as those described above without introducing appreciable risk. Provided adequate testing is regularly performed, such approaches may be broadly adequate within limits.

For some systems, such as those installed in trespass-sensitive environments or in extremely large or multi-building alarm system configurations, provision of a plurality of detection strings may be desirable to improve localization. Similarly, where testing may suggest that one of a large number of sensors on a string is faulty or is located proximal to a wiring damage incident, localization can become an issue. Moreover, initial installation and modification of systems using known apparatus may demand meticulous—and costly—attention to detail and may nonetheless yield ambiguous test results.

In systems using multiple sensors, power consumption within individual sensors, while small, can cumulatively become a limiting factor. In addition to power limitations, signaling trustworthiness of individual sensors of known types back to an alarm system control panel, both during initialization and during an event, can be limited by loading, noise, and related issues.

There are existing methods and apparatus that support, to at least some extent, periodic test and troubleshooting, while maintaining substantially complete functionality. However, many of these existing approaches have been shown to be limited in some applications regarding ease of installation, expandability, verification, and other considerations.

Standards for safety in systems involving life and property are controlled in most countries, using combinations of government agencies, insurance underwriters, and industry practices. In the United States, for example, local building codes typically refer to practices stipulated by the National Fire Protection Association (NFPA) and to Underwriters Laboratories® documents such as UL 864 and associated standards to identify approved components and to restrict practices to those validated by rigorous testing.

Since many existing fire alarm and related systems require maintenance, upgrading, and expansion, introduction of new apparatus incompatible with existing systems can result in market resistance. Even if the concepts motivating the new apparatus are otherwise desirable, incompatibility may deter end users from adopting the enhanced protection of successor devices.

Accordingly, there is a need in the art for an alarm system sensor topology that simplifies installation, reduces troubleshooting time and effort, increases immunity to at least some fault conditions, reduces power consumption, and extends expandability. It is further desirable that such a topology include compatibility with existing systems at least to the extent of permitting prior and successor components to be intermixed in a single system without penalty, and still further desirable that the intermixture of components provide potential for operational enhancement to a system wherein the successor components are installed.

SUMMARY OF THE INVENTION

The foregoing needs are met, to a great extent, by the present invention, wherein an apparatus and method are provided that in some embodiments simplify installation, reduce troubleshooting time and effort, increase immunity to certain fault conditions, reduce power consumption, and/or extend expandability in installing, operating, and/or maintaining a distributed sensor-based alarm system. The present invention further affords at least partial compatibility with existing systems, and provides potential for operational enhancement in a system wherein existing components and successor components are intermixed according to suitable schemes.

In accordance with one embodiment of the present invention, an alarm system sensor topology that reduces susceptibility to system configuration errors and individual component failures is presented. The alarm system sensor topology includes a sensor configured to detect an attribute of its surroundings, wherein the sensor differentiates between at least two status conditions of the attribute, a first electrical power isolation function of the sensor, configured to provide power to support sensor operation regardless of a polarity of electrical power applied to the sensor, and a second electrical power isolation function of the sensor, configured to sustain sensor operation, at least in part, for a specified time interval in the absence of applied electrical power.

In accordance with another embodiment of the present invention, a topological method for reducing alarm system sensor susceptibility to system configuration errors and individual component failures is presented. The method includes configuring a sensor to detect an attribute of its surroundings, wherein the sensor differentiates between at least two status conditions of the attribute, providing, in a sensor input power management function, capability to operate using electrical input power independent of the polarity of the input power, and providing, in a sensor input power management function, capability to operate using electrical input power, wherein at least a part of the sensor circuitry is capable of continuing to operate for at least a specified time interval in the absence of applied electrical power.

In accordance with yet another embodiment of the present invention, an alarm system sensor topology that is configured to reduce susceptibility to system configuration errors and enable detection of individual component failures is presented. The topology includes a first sensor configured to detect an attribute of the surroundings thereof, wherein the first sensor differentiates between at least two status conditions of the attribute. The topology further includes a first terminal pair in the first sensor configured to accept power and communication signals from an alarm system control panel over a first two-wire link, wherein transposing power and communication connection polarity compared to a default polarity does not affect alarm system operation, and a second terminal pair in the first sensor configured to allow passage of power and communication signals from an alarm system control panel to a subsequent sensor over a second two-wire link from the second terminal pair in the first sensor to a first terminal pair in the subsequent sensor, wherein transposing the first terminal pair and the second terminal pair in configuring any sensor in a string of sensors linked by successive two-wire pairs does not affect operation of the sensor.

The topology further includes a power conditioning function within the first sensor, configured to establish a selected voltage combination for normal operation of electronic components within the first sensor, further configured to acquire and store charge during normal operation of the first sensor, and further configured to furnish stored charge for at least a specified time interval to at least a subset of the electronic components within the first sensor in response to interruption of applied power, and a communication transceiver function within the first sensor, wherein the first sensor draws power supply current at a default rate and at least one distinguishably different rate during successive time intervals to form data pulses detectable at the alarm system control panel. The topology further includes a relay in the first sensor that connects a first terminal of the first terminal pair to a first terminal of the second terminal pair through a first normally-closed pole of the relay, and that connects a second terminal of the first terminal pair to a second terminal of the second terminal pair through a second normally-closed pole of the relay, wherein activation of the relay interrupts continuity between the first pair and the second pair.

The topology further includes a test strategy for localization of at least one fault in a wire-connected distributed system of sensors, wherein the fault is an interconnection fault, a ground fault, or a sensor fault, wherein response of the power supply current monitor to the relay activation event allows discrimination between a fault located between the control panel and the activated relay and a fault located further from the control panel than the activated relay.

There have thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. It is also to be understood that the phraseology and terminology employed herein, as well as the abstract, are for the purpose of description, and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
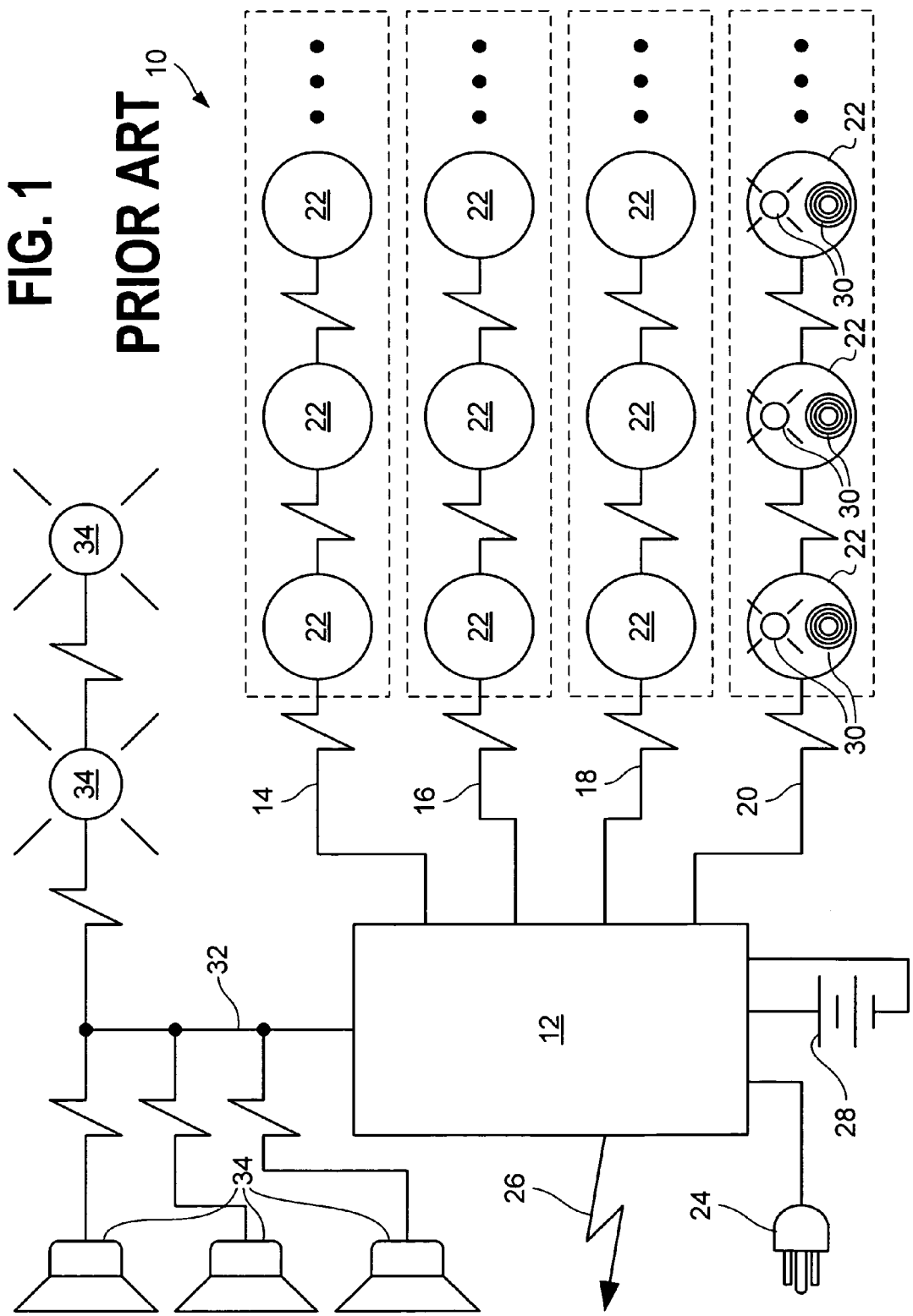
FIG. 1 is a topology diagram according to one embodiment of the prior art.

The invention will now be described with reference to the drawing figures, in which like reference numerals refer to like parts throughout. The present invention provides an apparatus and method that in some embodiments provides a control panel-to-sensor power distribution and communication topology for fire protection, security, and related applications.

As used herein, the term "topology" has one of its substantially conventional meanings, namely, configurations that are unaltered by elastic deformations such as elongation or twisting, provided a relative arrangement of parts or elements is unchanged. Comparisons between FIGS. 2 and 3 will show that the detailed topologies of a system incorporating prior art sensors alone and of a system using sensors according to the invention differ significantly.

FIG. 1 shows a generalized diagram 10 summarizing an embodiment of an alarm system. Except as noted, the diagram 10 can represent either a prior-art system or a system incorporating one or more embodiments of a sensor 22 according to the inventive apparatus and method. As shown in the figure, a central information management device—in this case, an alarm system control panel 12—is connected by direct physical wiring 14, 16, 18, and 20 to a plurality of sensors 22, wherein in the embodiment shown there are four separate strings connected to isolated sets of sensors 22. In the embodiment shown, the sensors 22 receive electrical power using the same wiring 14, 16, 18, and 20 by which sensed events are signaled back to the control panel 12.

The control panel 12 in the embodiment shown is connected to premises electrical power 24 and to a message transmission system 26 for contacting emergency services. While such connections may be preferred in some embodiments, they may not be available for others. For example, a battery-based or fuel cell power source 28 may be used alone to operate the system 10, although such a source may be provided in some embodiments as a backup to a premises power source 24. Similarly, annunciation associated with the system may be entirely internal to the system rather than including methods such as telephones and Internet messaging 26. The sensors 22 in some embodiments may include acoustical and visual annunciation 30 applied over the same wiring 14, 16, 18, and 20 used for sensor power and detection events. Such use of sensor wiring for annunciation is of limited feasibility for some sensors and topologies. In some embodiments, additional wiring 32 in support of separate signaling devices 34 may be preferred. It is to be understood that interconnections shown in FIG. 1 to use physical wiring may in some embodiments include fiber-optic, radio, or other technologies in whole or in part.

Figure 2:
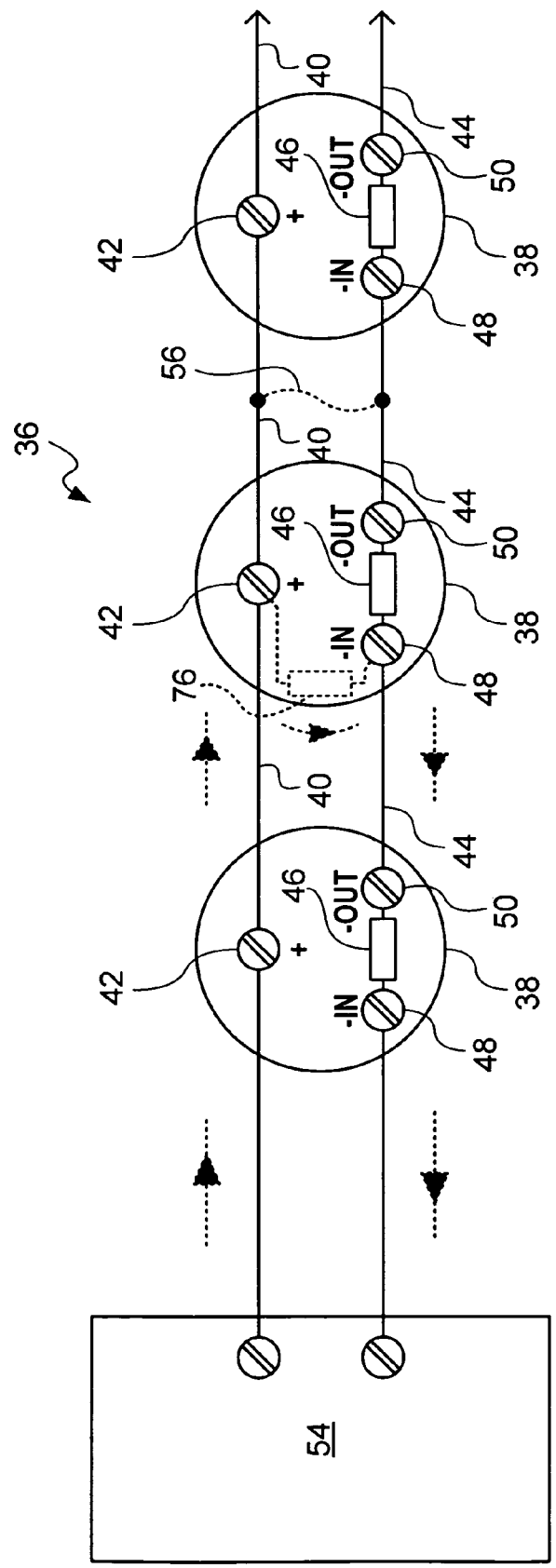
FIG. 2 is a subsystem wiring diagram according to one embodiment of the prior art.

FIG. 2 shows a field wiring arrangement 36 suitable for sensors 38 according to known methods. In the prior-art embodiment shown, the power and signal wiring uses a first wire 40 that is "daisy chained" from sensor 38 to sensor 38, linking a first, common terminal 42 of each of the respective sensors 38, while a second wire 44 is interrupted by a fixed resistor 46 connected between a second, upstream terminal 48 and a third, downstream terminal 50 at each sensor 38 in each string. The string of series resistors 46 can be used by an alarm system control panel 54 as a component of a mapping function, whereby sensor interconnection may be sensed.

Finding exact locations of faults may be onerous, using such methods as interrupting wiring to localize short circuits. Additionally, if the sensors 38 use interrogation-and-response communication (polling) with the control panel 54, then open circuits in the string wiring may be inferred from failures of sensors 38 beyond a certain point in a string to respond to polling.

It should be noted that the resistance of the wiring would preferably be small compared to that of the fixed resistors 46, and that the power and communication functions of the wires 40 and 44 are circumscribed by the need to support the many nonfunctional voltage drops of the resistors 46 during normal operation. The ultimate number of sensors in a single sensor string—256 devices in the prior-art embodiment shown—is bounded by the ability of the control panel 54 to supply power. Because the resistors 46 are preferably low in numerical value to allow extended strings, the resistance—and even the temperature coefficient of resistance—of long wire runs can introduce appreciable uncertainty, commonly offset by repeated remapping by the control panel 54. Thus, while the configuration shown is widely used, it has distinct drawbacks.

Figure 3:
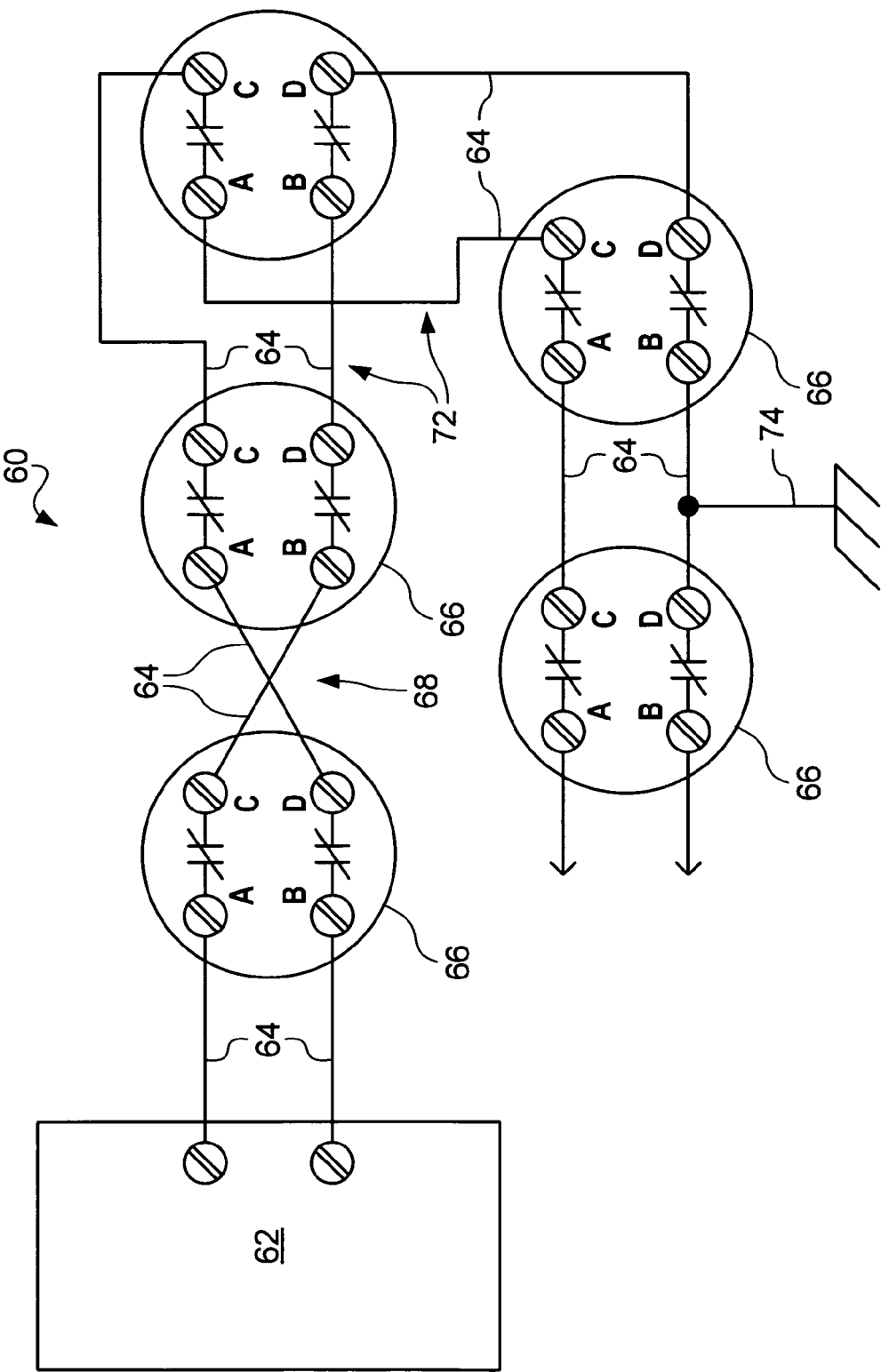
FIG. 3 is a subsystem wiring diagram for an embodiment of the invention analogous to the prior-art configuration of FIG. 2, contrasting respective methods of use.

FIG. 3 shows a field wiring arrangement 60 for a single string of sensors according to a preferred embodiment of the inventive apparatus and method. Here, an alarm system control panel 62 has two-wire connectivity 64 to multiple sensors 66, each of which preferably includes an embodiment of the invention. It will be observed that the wires are crossed 68 between two sensors 66 (reversed in polarity, not shorted together), are wired "backward" 70 between two other sensors 66, are wired in a mixed configuration 72 between still other sensors 66, and include a short to ground 74 in a location. Each of these wiring errors would likely cause a system using the prior art to fail. It will also be observed that there are no fixed resistors between terminals of the sensors 66, so that at least a power-derived limitation on sensor 66 string length is potentially obviated. It is to be understood that the number of such strings driven from a control panel 62 is dictated by user preference.

For compatibility with systems using at least one prior-art method, signaling between a sensor 66 and a control panel 62 can use sequences of momentary variations in conduction between the power lines 64, detected by the sensor 66 or the control panel 62 as pulse sequences and interpreted as messages. Numerous protocols for such messages are possible, and may in some embodiments include information such as start and stop codes, source and/or target addresses, specific data or command codes, checksum or other validation codes, and the like. Bit (code element) duration and synchronization can be controlled by such methods as use of crystal oscillators to provide precise timing in each sensor 66, use of a master oscillator in the control panel 62 that transmits periodically to resynchronize the sensors 66, and other methods as appropriate. Where accommodation of uncertain wire quality is called for, bit rates and slew rates may preferably be low, for example to reduce bit errors associated with ringing at unbalanced terminations.

Attributes such as encoding scheme (polar/unipolar/bipolar, using return-to-zero (RZ), non-RZ (NRZ), Manchester, biphase, differentiated pulses, or another), bit rate, duty cycle, and rise and fall time are preferably selected for suitability to an application. Typical protocols for sensor to control panel communication use two-level, baseband transmission, with a default (minimum current, highest terminal voltage) condition during logical zeros or times of no signal and a higher-current condition to represent a logical one or an active time. Alternative modulation schemes, some of which may use three or more discrete current levels, may be preferred in some embodiments. Several specific protocols are controlled by standards published by various organizations.

Figure 4:
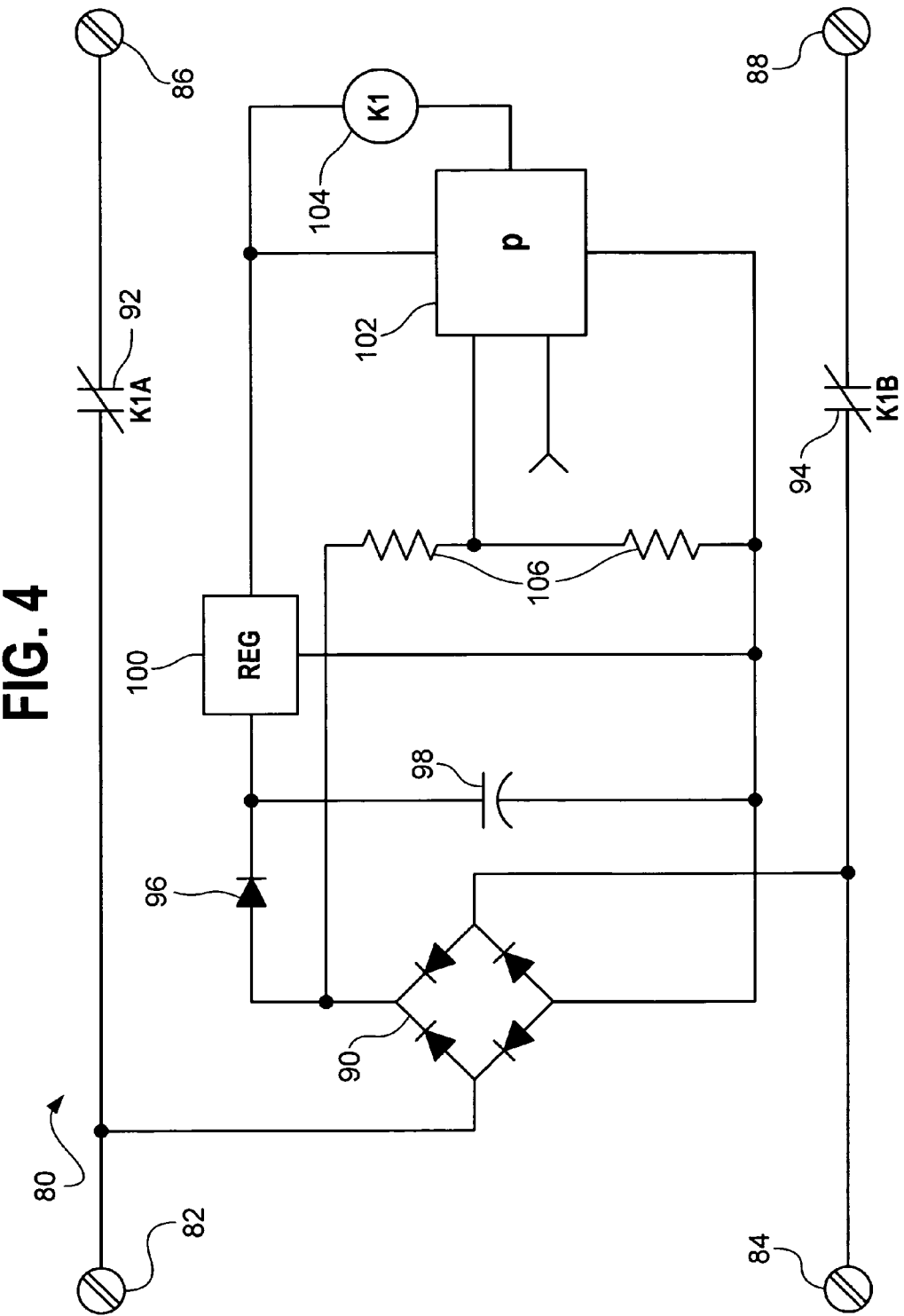
FIG. 4 is a sensor module circuit diagram according to one embodiment of the invention.

FIG. 4 shows a schematic diagram of a sensor 80 incorporating an embodiment of the invention. Power is nominally applied on terminals 82 and 84, respectively designated upstream high and upstream low, and is carried to a next sensor on terminals 86 and 88, respectively designated downstream high and downstream low. A bridge rectifier 90 positioned across the terminals allows input power to be polarity insensitive. Normally-closed electromechanical relay contacts K1A 92 and K1B 94 maintain connectivity between the high terminal pair 82 and 86 and between the low terminal pair 84 and 88, respectively, with the exception noted below. An isolation diode 96 decouples circuit power from raw interconnect power. A regulator 100 provides controlled voltage during normal operation. Order between the diode 96/capacitor 98 network and the regulator 100 may be exchanged in some embodiments. Onboard electronic circuitry 102 is represented in the diagram by a microprocessor, but may include sense functions such as ionization or particle detection circuits in some embodiments. Relay contacts K1A 92 and K1B 94 can be switched to the open condition by application of power to the relay coil K1 104.

Voltage level across the bridge 90 may be generally fixed for a given sensor 80 within a string except when functions such as signaling between a control panel 62, shown in FIG. 3, and a sensor 80 take place. Thus a line monitor function, represented by a resistor divider pair 106 across the unregulated output of the bridge 90, can provide a reference level for the onboard electronic circuitry 102 to average, and can develop pulse sequences for the circuitry 102 to detect by comparison with the reference level. Other techniques for monitoring line levels and detecting pulses may be preferred in some embodiments. One of many such techniques (not shown) can capacitively couple the bridge 90 output to the midpoint of a divider pair across the regulator 100 and capture clipped transients with a threshold detector.

It may be observed that the sensor 80 of FIG. 4 is polarity insensitive, with a fixed penalty of two diode drops between the signal lines, plus a third diode drop across the isolation diode 96, leading to the electronics 100 and 102. It is to be observed that the diode drops are in parallel for all sensors, so that cumulative voltage drop along a sensor string is a function of wire resistance, while string length may depend on control panel power supply voltage, which is typically defined by published standards. The available regulator input voltage after the diodes 90 and 96 for the last sensor in a string can limit string length for a particular wire gauge, although, in some embodiments, string length may be limited by the available range of addresses for the sensors 80. Schottky diodes and other low-loss rectification technologies may significantly reduce forward drop and hence power loss in the bridge 90 and the isolation diode 96. Some regulators 100 may support boosting as well as down-regulating the supply voltage, which may further increase string length.

In some embodiments using prior-art sensors along with known control panels, system initialization includes polling by a control panel 54 in FIG. 2, with the control panel 54 applying polling commands in the form of serial data pulses coupled onto the power lines 40 and 44. These pulses, typically in the form of sequences of short-duration reduced-level voltages on the positive signal line, are interpretable by the sensors as commands, including a command to self-identify. For embodiments using a product serial number embedded during manufacture as a unique identifier for each sensor 38 (required by some communications protocols), typical initialization polling may include the control panel 54 transmitting a polling command header followed by a possible first address, with each transmitted address bit stimulating replies from all sensors 38 having that bit true. Provided that the communication protocol tolerates multiple talkers, the control panel 54 can then detect all addresses with at least one sensor 38 having that bit true.

For example, if the first bit is a 1, but all sensors 38 have that address bit a 0, then none will reply to the bit, and the control panel 54 can eliminate all addresses beginning with 1 and restart polling with addresses beginning with 0, which will cause all of the sensors 38 to reply by momentarily switching a shunt impedance across their respective input terminals 42 and 48. The control panel 54 will detect response traffic and deduce that at least one sensor 38 has an address beginning "0". If the second bit is a 1, and at least one of the sensors 38 has that address bit a 1, then the control panel 54 will detect response traffic again and deduce that at least one sensor 38 has an address beginning "0-1". This sieve process can continue, with the presence of at least one sensor 38 with an "nth" bit of value "m" detected each time, until all possible addresses have been explored and all installed sensors 38 mapped. The control panel 54 can then address each sensor 38 individually (using a different command header, for example) to assign it a shorthand equivalent of its long address. If there is a conflict, such as a missing sensor 38 serial number compared to a master list stored in the control panel 54, manual troubleshooting can be used to find the error. This prior-art signaling method is represented in FIG. 2 by a phantom conductive element 76, to be applied and removed at a data rate suited to wiring styles commonly used in fire protection applications.

In other embodiments using prior-art sensors 38 along with known control panels 54, the sensors 38 may have code numbers set by switches on their bodies (typical of some protocols other than those already described). Such numbers may simplify initialization, since the settings may be known to the control panel 54 in advance, while increasing the risk of setup error as multiple sensors can be misset to the same number, electromechanical switches can add failure modes, and so forth. In these and other embodiments, faults such as open or shorted wiring or reverse-wired or defective sensors 38 may cause the initialization to be incomplete and may thus require manual troubleshooting.

By contrast, as shown in the configuration 60 in FIG. 3, sensors 66 incorporating the inventive communication topography can be configured with fewer possible failure modes. For example, since most prior-art wiring errors are no longer errors, reversed wiring as a failure mode is eliminated, with only dead shorts due to "90 degree" miswiring needing detailed, manual half-split troubleshooting. Next, since there are no discrete series resistors, signal attenuation is due only to copper losses and shunt loading, which may reduce the degree of receiver discrimination needed. Various protocols may be supported, including at least all supported by the prior art. It is to be understood that the initialization schemes indicated above can be suited to both old and new sensors, with comparable but somewhat sharper switching thresholds in some new-sensor embodiments. In the prior art, in order to maintain reasonable voltage for long wire runs, internal resistance within each sensor is small. This arrangement is generally effective but can be susceptible to some types of errors, such as phantom signals from external noise, that are prevented by the novel apparatus and method. The increased effective signal-to-noise ratio of the novel sensor and topography may increase limits for allowable wire runs, for example.

In a system using sensors according the inventive apparatus and method, decreased continuous voltage drop per sensor can increase the possible number of sensors per string. Alternatively, increased power loading per sensor may be possible, such as provision of power to a strobe light, a sound generator, or the like integrated with one or more of the sensors in a string.

As shown in FIG. 4, relay contacts K1A 92 and K1B 94 are connected in series with the upper 82 and 86 and lower 84 and 88 pairs of terminals, respectively. In some embodiments, the relay contacts are closed at all times except when the fire panel 62 in FIG. 3 sends a message to a subject sensor that causes it to actuate the relay. A useful actuation may be a momentary interval on the order of 10 milliseconds, which is realizable by many miniature relay types and can provide a signal interruption large enough to be detected by at least some of the devices in the string. A UL 864-listed fire panel 62 can be configured to sense the reduction in electrical load, and sensors further from the fire panel 62 than the subject device can be configured to detect the transient loss and recovery of input power. Such an interruption can be used in configuring and troubleshooting. For example, a complete physical mapping of the string can be established by commanding an interruption, then interrogating selected sensors to determine which detected the interruption. Repeating this process can allow the relative positions of all of the sensors to be determined. A procedure for performing this operation may be programmable into a listed fire panel 62.

Using this function for troubleshooting, if a momentary interruption is used as a rapid "aliveness" test between the fire panel and each sensor, a fault-free string can be validated rapidly by the change in current draw during the interruption. If a momentary interruption provides no result detectable at the fire panel 62, then the string may be failed open not further than immediately after the activated sensor. As an alternative, periodic polling of all mapped sensors can pinpoint interconnection faults by identifying a last operational address, as well as identifying any nonresponding and thus failed sensors. Also, a single ground fault in a string (or multiple ground faults that all occur on the same wire of the pair), may be continuously evident at the fire panel 62, but will momentarily disappear during the interruption if the addressed sensor is closer to the fire panel than the fault. In a plurality of ground faults, the more distal faults are typically masked by the most proximal unless the proximal one is weak-that is, ohmic rather than forming a hard short circuit to ground.

In topologies mixing prior-art and novel sensors, if the novel sensors are placed at intervals among the prior-art sensors, then some of the functionality of the novel sensors is usable, such as the methods for mapping the novel sensors themselves and for detecting open circuits and ground faults. This can at least partially ease manual troubleshooting chores.

This disclosure has focused on applications of the novel sensor topology to a class known to those familiar with the art as fire control panels, where individual components of systems using fire control panels, interconnecting wiring, associated sensors, alarm annunciators, and the like are generally agency certified for protection of lives and property by detection of smoke, heat, dangerous gases, particulate matter, and other indicators of fire-related dangers. In addition to fire control panels, the novel sensor topology is suitable for application to systems for security (intrusion, vandalism, theft, water penetration, or other integrity violations), client care (i.e., medical, academic, or other service functions), manufacturing processes, infrastructure monitoring, and numerous other detection and oversight tasks.

Multi-function systems are likewise suited to the novel sensor topology. For example, an amusement park can have perimeter and individual structure intrusion detectors using infrared, magnetic, optical, and other technologies, fire and weather sensors using various types of detectors such as those noted above, shoplifting alert devices at sales locations, lamp failure detectors for safety and aircraft clearance lighting, and the like. Such a park can have accelerometers affixed to the frames of rides to detect weakness in structural members, drive motor current monitors, flow monitors, safety bar closure detection telemetered from moving cars, and the like. Groups of sensors can be configured to report status to individual control panels, with the control panels in turn performing some autonomous functions and reporting to centralized locations for record keeping, communication with management and emergency agencies, and the like.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An alarm system sensor topology configured to reduce susceptibility to system configuration errors and individual component failures, comprising:
    a sensor configured to detect an attribute of its surroundings, wherein the sensor differentiates between at least two status conditions of the attribute, wherein the sensor is linked to an information management apparatus, and wherein information from the sensor is acquired, analyzed, and acted upon;
    a first electrical power isolation function of the sensor, configured to provide power to support sensor operation regardless of a polarity of electrical power applied to the sensor; and
    a second electrical power isolation function of the sensor, configured to isolate sensor operation, at least in part, from system power conditions.

2. The alarm system sensor topology of claim 1, further comprising an electrical distribution link between the information management apparatus and the sensor, wherein power from the information management apparatus is applied to the sensor via electrical wiring.

3. The alarm system sensor topology of claim 2, wherein the information management apparatus comprises an alarm system control panel configured to send and receive information to and from a plurality of sensors located separately therefrom.

4. The alarm system sensor topology of claim 2, wherein the alarm system control panel is a fire control panel, a security system control panel, a manufacturing process system control panel, a client care system control panel, an infrastructure monitoring system control panel, or a system control panel in support of a plurality of detection tasks.

5. The alarm system sensor topology of claim 3, wherein the sensor further comprises a communication transceiver providing information interchange between the sensor and the information management apparatus via signals coupled to the electrical distribution link.

6. The alarm system sensor topology of claim 5, wherein the sensor further comprises at least partial interoperability with sensors differing in sensor interconnection topology in at least one aspect.

7. The alarm system sensor topology of claim 2, wherein the first electrical power isolation function further comprises:
    a first combined power and signal port, wherein the first port has a first electrical terminal and a second electrical terminal;
    a second combined power and signal port, wherein the second port has a first electrical terminal and a second electrical terminal; and
    a bridge rectifier, wherein a first node of the bridge receives power from the first terminal of the first port, wherein a second node, separated by two diodes from the first node, receives power from the second terminal of the first port, wherein a third node of the bridge, intermediate between the first and second nodes, provides a positive output voltage for any polarity of first port input, wherein a fourth node of the bridge, intermediate between the first and second nodes and separated by two diodes from the third node, provides a negative output voltage for any polarity of first port input.

8. The alarm system sensor topology of claim 7, wherein the second electrical power isolation function further comprises:
    a rectifier diode configured to couple the bridge rectifier to an electronic load for conditions wherein the voltage differential across the bridge has a specified polarity and exceeds the voltage differential across the electronic load by a specified amount, and to decouple the load from the bridge otherwise; and
    a power storage circuit element, connected across the electronic load, wherein the storage element successively acquires potential and retains potential when the rectifier diode couples the bridge to the electronic load, wherein the storage element discharges potential into the electronic load when the rectifier diode decouples the bridge from the electronic load.

9. The alarm system sensor topology of claim 5, wherein the sensor communication transceiver further comprises:
    a message generator within the sensor, wherein at least one data bit sequence is compiled and presented for transmission, wherein the bit sequence includes an information bit and any bits required for sensor identification, authentication, message timing, and fill, wherein the bit sequence is presented with bit characteristics compatible with system requirements for information interchange and timely system operation, wherein bit characteristics include at least one of encoding scheme, bit rate, rise time, and fall time; and a variable load applied between the respective first and second terminals of at least one of the first port and the second port, wherein the load has at least two values of effective current draw that are distinguishably different at the fire control panel, wherein a first and a second value of current draw respectively represent a first and a second logic state in serial data transmissions sent from the communication transceiver to the fire control panel, wherein the bit sequence and timing are provided from the message generator.

10. The alarm system sensor topology of claim 9, wherein the communication transceiver further comprises a message detector within the sensor, and operates continuously while sufficient power is present to operate all functions of the sensor, wherein a first voltage level presented across the terminals of the first port is interpretable by the message detector as a first logic state, wherein detection of a second voltage level lower in magnitude than the first level is interpretable as a second logic state, wherein detection of a succession of states having duration and sequence consistent with a specified message format is interpretable as a message.

11. The alarm system sensor topology of claim 10, wherein the message detector further comprises a level compensator, wherein persistence of a voltage level within a specified range for a specified duration associates that voltage level with the first logic state.

12. The alarm system sensor topology of claim 11, wherein the message detector further comprises an in-sensor power loss detector, wherein loss of applied power for a specified interval is recorded by the sensor, wherein a recorded datum from a specific sensor can be transmitted to a fire control panel associated with the specific sensor.

13. The alarm system sensor topology of claim 5, further comprising:

a first switchable electrical connection, whereby an electrical signal path from the first port, first terminal to the second port, first terminal is established in a first connectivity state and interrupted in a second connectivity state; and a second switchable electrical connection, whereby an electrical signal path from the first port, second terminal to the second port, second terminal is established in the first connectivity state and interrupted in the second connectivity state.

14. The alarm system sensor topology of claim 13, wherein the first switchable electrical connection and the second switchable electrical connection each comprise electromechanical relay poles, wherein the contact state for each relay pole is normally-closed, wherein each pole is at least single-throw, wherein the relay architecture is selected from the group consisting of a single relay having at least two poles, and a pair of relays having at least one pole each.

15. The alarm system sensor topology of claim 13, wherein at least one ground fault in sensor wiring, detectable at the alarm system control panel as an erroneous conductivity path between a node of the alarm system control panel power supply and a ground node, is positionally localizable through commanded interruption of conductivity in at least one switchable electrical connection in at least one sensor.

16. The alarm system sensor topology of claim 13, wherein interruption of conductivity in at least one switchable electrical connection in each of a plurality of sensors, commanded by the alarm system control panel and detected as an electrical phenomenon by at least one detector on a wiring string, provides position discrimination between the sensors and thereby enables unique mapping of sensor position within a sensor wiring configuration.

17. A topological method for reducing fire sensor susceptibility to system configuration errors and individual component failures, comprising:

configuring a sensor to detect an attribute of its surroundings, wherein the sensor differentiates between at least two status conditions of the attribute;

providing, in a sensor input power management function, capability to operate using electrical input power independent of the polarity of the input power;

providing, in a sensor input power management function, capability to operate using electrical input power, wherein at least a part of the sensor circuitry is isolated, at least in part, from system power conditions;

managing information at a location remote from a sensor, wherein information from the sensor is acquired, analyzed, and acted upon, and wherein information to be directed to the sensor is managed;

distributing electrical power from the information managing location to the sensor, wherein power from the information managing location is applied to the sensor via electrical wiring;

sending information from the information managing location to the sensor; and receiving information at the information managing location from the sensor.

18. The topological method of claim 17, wherein sending and receiving information further comprises coupling signals to and from electrical wiring, whereby information is interchanged between the sensor and the information managing location.

19. The topological method of claim 18, wherein providing polarity-independent capability to operate the sensor using electrical input power from the information managing site further comprises:

first combining of power and signal interface connectivity within the sensor, wherein the first combining of connectivity within the sensor has a first electrical terminal and a second electrical terminal thereof, wherein a first voltage differential applied between the first terminal and the second terminal by the information managing site serves as a source of electrical power within the sensor;

second combining of power and signal interface connectivity within the sensor, wherein the second combining of connectivity within the sensor has a first electrical terminal and a second electrical terminal thereof; and accomplishing polarity-insensitive bridge rectification, wherein a first node of the bridge receives power from the first terminal of the first combining within the sensor, wherein a second node of the bridge, separated by a first series-connected pair of diodes from the first node of the bridge, receives power from the second terminal of the first combining within the sensor, wherein a third node of the bridge, positioned electrically between the diodes of the first pair of diodes, provides a positive power source to an internal locus within the sensor for any applied polarity on the first terminal, wherein a fourth node of the bridge, positioned electrically between a second series-connected pair of diodes connected respectively to the first and second terminals, and separated by two combinations of diodes from the third node, provides a negative power source within the sensor for any polarity applied on the second terminal, opposite to the polarity applied on the first terminal.

20. The topological method of claim 19, wherein isolating an electrical power source within the sensor further comprises:

allowing flow of electrical current from the third node, through an electrical load within the sensor, to the fourth node, under a condition wherein a voltage present between the third node and the fourth node exceeds a voltage present across the electrical load by an amount sufficient to exceed a voltage conduction threshold;

blocking flow of electrical current from the third node, through an electrical load within the sensor, to the fourth node, under a condition wherein a voltage present between the third node and the fourth node is less than an amount sufficient to exceed a voltage conduction threshold; and storing electrical energy within the electrical load, wherein the energy so stored is available for use by components of the electrical load under a condition wherein electrical current from the third node is blocked.

21. The topological method of claim 20, wherein isolating an electrical power source within the sensor further comprises:

detecting the voltage present between the third node and the fourth node, wherein the precision with which the voltage is characterized satisfies a specified precision criterion; and transmitting the voltage characterization from the sensor to the central site.

22. An alarm system sensor topology that is configured to reduce susceptibility to system configuration errors and enable detection of individual component failures, comprising:

a first sensor configured to detect an attribute of the surroundings thereof, wherein the first sensor differentiates between at least two status conditions of the attribute;

a first terminal pair in the first sensor configured to accept power and communication signals from an alarm system control panel over a first two-wire link, wherein transposing power and communication connection polarity compared to a default polarity does not affect alarm system operation;

a second terminal pair in the first sensor configured to allow passage of power and communication signals from an alarm system control panel to a subsequent sensor over a second two-wire link from the second terminal pair in the first sensor to a first terminal pair in the subsequent sensor, wherein transposing the first terminal pair and the second terminal pair in configuring any sensor in a string of sensors linked by successive two-wire pairs does not affect operation of the sensor;

a power conditioning function within the first sensor, configured to establish a selected voltage combination for normal operation of electronic components within the first sensor, further configured to acquire and store charge during normal operation of the first sensor, and further configured to isolate sensor operation, at least in part, from system power conditions;

a communication transceiver function within the first sensor, wherein the first sensor draws power supply current at a default rate and at least one distinguishably different rate during successive time intervals to form data pulses detectable at the alarm system control panel;

a relay in the first sensor that connects a first terminal of the first terminal pair to a first terminal of the second terminal pair through a first normally-closed pole of the relay, and that connects a second terminal of the first terminal pair to a second terminal of the second terminal pair through a second normally-closed pole of the relay, wherein activation of the relay interrupts continuity between the first pair and the second pair; and a test strategy for localization of at least one fault in a wire-connected distributed system of sensors, wherein the fault is an interconnection fault, a ground fault, or a sensor fault, wherein response of the power supply current monitor to the relay activation event allows discrimination between a fault located between the control panel and the activated relay and a fault located further from the control panel than the activated relay.

* * * * *